US012604362B2

(12) United States Patent
Basu Mallick et al.

(10) Patent No.: US 12,604,362 B2
(45) Date of Patent: Apr. 14, 2026

(54) DISCONTINUOUS RECEPTION CONFIGURATION FOR SIDELINK COMMUNICATION

(71) Applicant: Lenovo (Singapore) Pte. Ltd., New Tech Park (SG)

(72) Inventors: Prateek Basu Mallick, Dreieich (DE); Karthikeyan Ganesan, Kronberg im Taunus (DE); Joachim Loehr, Wiesbaden (DE); Ravi Kuchibhotla, Chicago, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 237 days.

(21) Appl. No.: 18/256,006

(22) PCT Filed: Dec. 6, 2021

(86) PCT No.: PCT/IB2021/061380
§ 371 (c)(1),
(2) Date: Jun. 5, 2023

(87) PCT Pub. No.: WO2022/118300
PCT Pub. Date: Jun. 9, 2022

(65) Prior Publication Data
US 2024/0057207 A1 Feb. 15, 2024

Related U.S. Application Data

(60) Provisional application No. 63/121,717, filed on Dec. 4, 2020.

(51) Int. Cl.
| | |
|---|---|
| *H04W 76/28* | (2018.01) |
| *H04W 72/25* | (2023.01) |
| *H04W 92/16* | (2009.01) |

(52) U.S. Cl.
CPC .......... *H04W 76/28* (2018.02); *H04W 72/25* (2023.01); *H04W 92/16* (2013.01)

(58) Field of Classification Search
None
See application file for complete search history.

(56) References Cited

U.S. PATENT DOCUMENTS

| | | | |
|---|---|---|---|
| 2016/0366645 A1* | 12/2016 | Song ................. | H04W 52/0229 |
| 2020/0304968 A1 | 9/2020 | Lee et al. | |

(Continued)

FOREIGN PATENT DOCUMENTS

| | | |
|---|---|---|
| WO | 2014092612 A1 | 6/2014 |
| WO | 2015169406 A1 | 11/2015 |

(Continued)

OTHER PUBLICATIONS

PCT/IB2021/061380, "Notification of Transmittal of the International Search Report and the Written Opinion of the International Searching Authority, or the Declaration", International Searching Authority, Mar. 9, 2022, pp. 1-9.

(Continued)

*Primary Examiner* — Jamaal Henson
(74) *Attorney, Agent, or Firm* — Kunzler Needham & Hilton

(57) ABSTRACT

Apparatuses, methods, and systems are disclosed for inter-UE coordination when using SL discontinuous reception ("DRX"). One apparatus includes a transceiver and a processor that determines a DRX configuration that is to be used towards a peer UE, where the DRX configuration includes an active time during which sidelink data is exchanged with the peer UE. The processor determines a set of resources for sidelink communication and identifies an intersection of the active time and the set of resources. The transceiver trans- (Continued)

mits to the peer UE an indication of the identified intersection of the active time and the set of resources.

20 Claims, 8 Drawing Sheets

(56) References Cited

U.S. PATENT DOCUMENTS

| | | | | |
|---|---|---|---|---|
| 2021/0059005 A1* | 2/2021 | Hosseini | .............. | H04W 76/28 |
| 2022/0312543 A1* | 9/2022 | Wu | ................... | H04W 52/0216 |
| 2022/0322359 A1* | 10/2022 | Ye | ......................... | H04W 72/02 |
| 2023/0014303 A1* | 1/2023 | Di Girolamo | ........ | H04W 72/20 |
| 2023/0082194 A1* | 3/2023 | Liu | .................. | H04W 52/0216 |
| 2023/0239793 A1* | 7/2023 | Lin | .................... | H04W 52/028 |
| | | | | 370/311 |
| 2023/0345515 A1* | 10/2023 | Selvanesan | ........... | H04W 72/53 |

FOREIGN PATENT DOCUMENTS

| | | | | | |
|---|---|---|---|---|---|
| WO | WO-2018016882 A1 * | 1/2018 | ........... | H04W 8/005 |
| WO | WO-2021003693 A1 * | 1/2021 | .......... | H04W 52/028 |

OTHER PUBLICATIONS

LG Electronics, "New WID on NR sidelink enhancement", 3GPP TSG RAN Meeting #86 RP-193231, Dec. 9-12, 2019, pp. 1-6.
LG Electronics, "WID revision: NR sidelink enhancement", 3GPP TSG RAN Meeting #88e RP-201385, Jun. 29-Jul. 3, 2020, pp. 1-6.
3GPP, "3rd Generation Partnership Project; Technical Specification Group Radio Access Network; Study on evaluation methodology of new Vehicle-to-Everything (V2X) use cases for LTE and NR; (Release 15)", 3GPP TR 37.885 V15.3.0, Jun. 2019, pp. 1-38.
3GPP, "3rd Generation Partnership Project; Technical Specification Group Radio Access Network; NR; Physical layer procedures for data (Release 16)", 3GPP TS 38.214 V16.3.0, Sep. 2020, pp. 1-166.
3GPP, "3rd Generation Partnership Project; Technical Specification Group Radio Access Network; NR; Medium Access Control (MAC) protocol specification (Release 16)", 3GPP TS 38.321 V16.2.0, Sep. 2020, pp. 1-154.

* cited by examiner

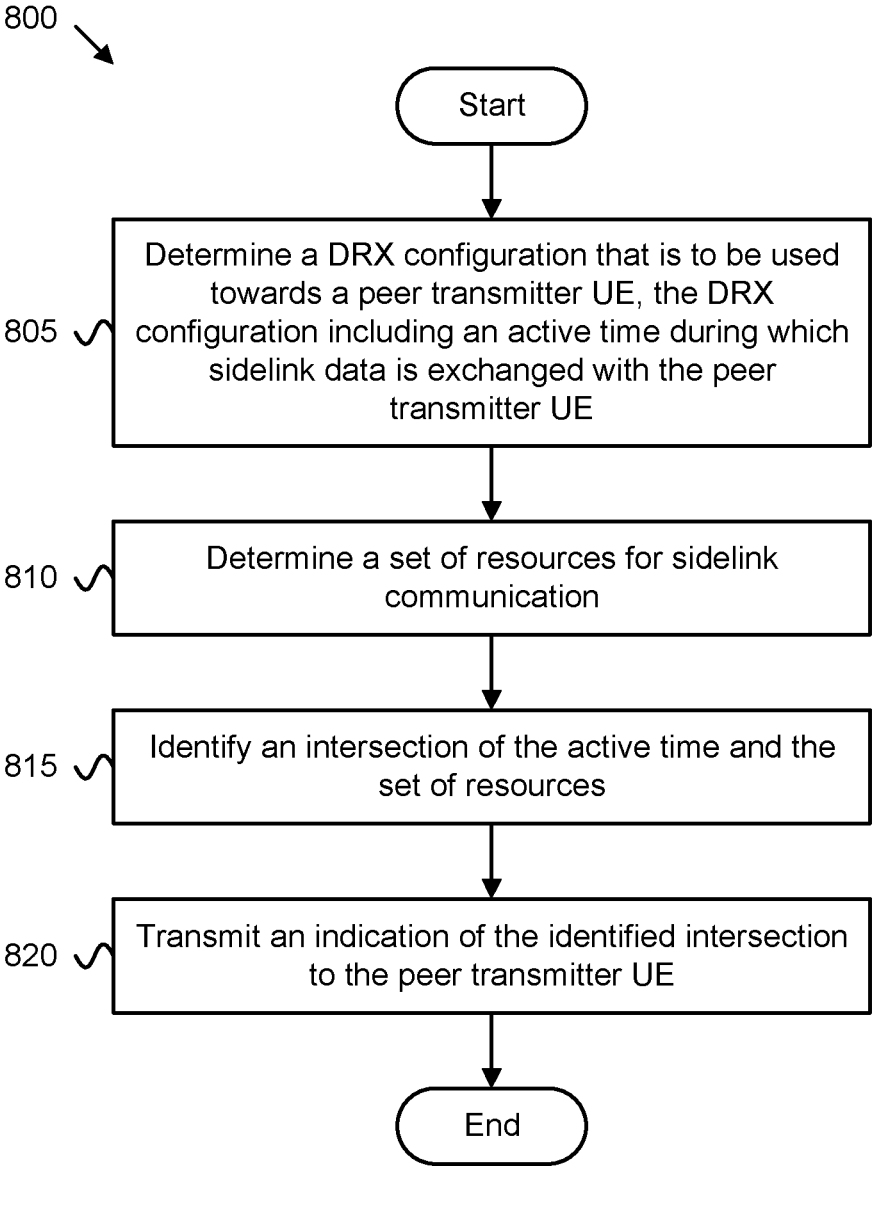

800

Start

805 — Determine a DRX configuration that is to be used towards a peer transmitter UE, the DRX configuration including an active time during which sidelink data is exchanged with the peer transmitter UE 810 — Determine a set of resources for sidelink communication 815 — Identify an intersection of the active time and the set of resources 820 — Transmit an indication of the identified intersection to the peer transmitter UE End

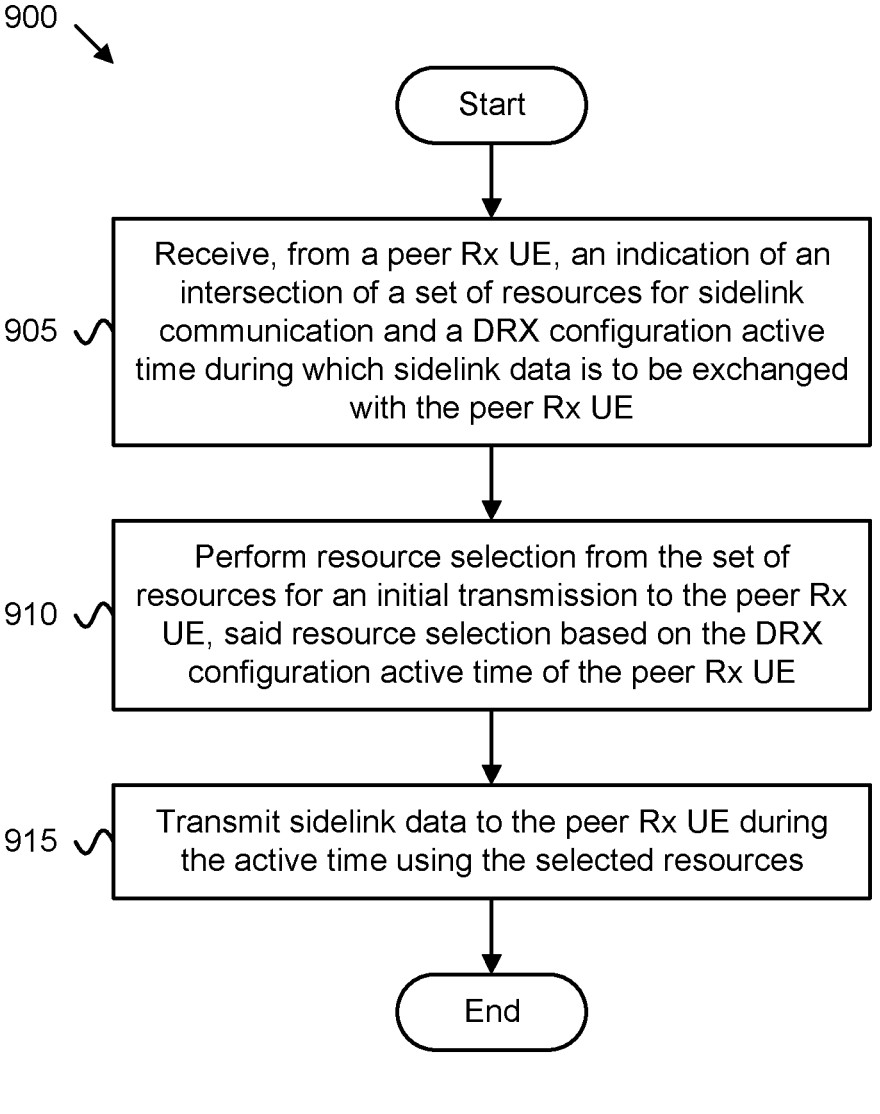

Start

905   Receive, from a peer Rx UE, an indication of an intersection of a set of resources for sidelink communication and a DRX configuration active time during which sidelink data is to be exchanged with the peer Rx UE 910   Perform resource selection from the set of resources for an initial transmission to the peer Rx UE, said resource selection based on the DRX configuration active time of the peer Rx UE 915   Transmit sidelink data to the peer Rx UE during the active time using the selected resources End

FIG. 9

DISCONTINUOUS RECEPTION CONFIGURATION FOR SIDELINK COMMUNICATION

CROSS-REFERENCE TO RELATED APPLICATIONS

This application claims priority to U.S. Provisional Patent Application No. 63/121,717 entitled "INTER-UE COOR-DINATION FOR EFFICIENT SIDELINK TRANSMIS-SION WHEN USING SIDELINK DRX" and filed on Dec. 4, 2020 for Prateek Basu Mallick, Karthikeyan Ganesan, Joachim Loehr, and Ravi Kuchibhotla, which application is incorporated herein by reference.

FIELD

The subject matter disclosed herein relates generally to wireless communications and more particularly relates to Inter-UE Coordination ("IUC") for efficient sidelink ("SL") communication when using SL discontinuous reception ("DRX").

BACKGROUND

Sidelink communication refers to peer-to-peer communication directly between User Equipment ("UE") devices. Accordingly, the UEs communicate with one another without the communications being relayed via the mobile network (i.e., without the need of a base station).

BRIEF SUMMARY

Disclosed are procedures for inter-UE coordination for efficient sidelink transmission when using SL DRX. Said procedures may be implemented by apparatus, systems, methods, or computer program products.

One method of a Receiver User Equipment ("Rx UE") for inter-UE coordination when using SL DRX includes determining a set of resources for sidelink communication and determining a discontinuous reception ("DRX") configuration that is to be used towards a peer Transmitter User Equipment ("Tx UE"), the DRX configuration including an active time during which sidelink data is exchanged with the peer transmitter UE. The method includes identifying an intersection of the active time and the set of resources and transmitting an indication of the identified intersection to the peer transmitter UE.

One method of a Tx UE for inter-UE coordination when using SL DRX includes receiving, from a peer Rx UE, an indication of an intersection of a set of resources for sidelink communication and a DRX configuration active time during which sidelink data is to be exchanged with the peer receiver UE. The method includes performing resource selection from the set of resources for an initial transmission to the peer receiver UE, said resource selection based on the DRX configuration active time of the peer receiver UE and transmitting sidelink data to the peer receiver UE during the active time using the selected resources.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 8 is a flowchart diagram illustrating one embodiment of a first method for inter-UE coordination when using SL DRX; and FIG. 9 is a flowchart diagram illustrating one embodiment of a second method for inter-UE coordination when using SL DRX.

DETAILED DESCRIPTION

Figure 1:
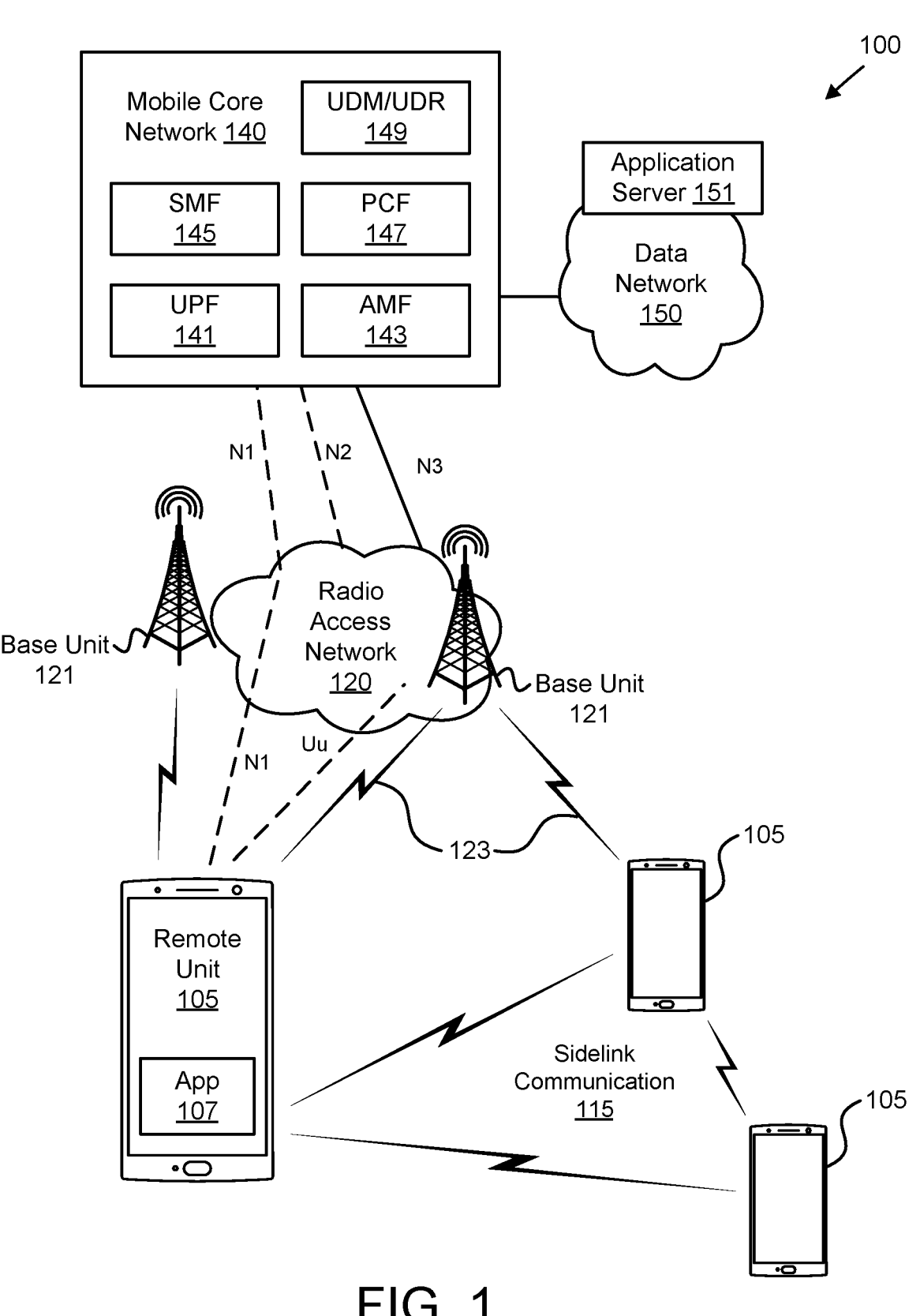
FIG. 1 is a block diagram illustrating one embodiment of a wireless communication system for inter-UE coordination when using SL DRX.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The call-flow diagrams, flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the call-flow, flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for enabling inter-UE coordination for efficient sidelink transmission when using sidelink DRX. In one embodiment, a set of resources is determined at a first SL UE, denoted UE-A. This set is sent to a second SL UE, denoted UE-B, in Mode-2 (i.e., UE-scheduled SL communication mode) and UE-B takes this into account in the resource selection for its own transmission. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

Inter-UE coordination has the benefit of enhanced reliability and reduced latency. Specifically, Inter-UE coordination aids a transmitter UE select transmission resources that allow higher probability of successful transmission to a given receiver UE. The sources of error (in transmission) come due to one or more of the following factors:

a. Half duplex issue where UE-A and UE-B are transmitting at the same time slot and cannot hear each other transmissions b. Poor radio resulting in, e.g., consecutive NACK(s)/DTX reception from Rx UE(s)

c. Congestion in the resource pool d. Interference at the receiver side due to hidden node Current inter-UE coordination efforts assume that the peer UEs are perpetually available for reception and transmission and therefore the focus is only to find suitable resources using Inter-UE coordination given a packet delay budget constraint. However, enhancements to inter-UE coordination are needed to support said peer UEs using a DRX configuration to save power.

With regards to Inter-UE coordination, some agreements in 3GPP are as follows: The schemes of inter-UE coordination in Mode 2 are categorized as being based on the following types of "A set of resources" sent by UE-A to UE-B. In one embodiment, UE-A sends to UE-B the set of resources preferred for UE-B's transmission, e.g., based on UE-A's sensing result. In one embodiment, UE-A sends to UE-B the set of resources not preferred for UE-B's transmission, e.g., based on UE-A's sensing result and/or expected/potential resource conflict. In one embodiment, UE-A sends to UE-B the set of resource where the resource conflict is detected.

The above summary gives a basic definition for "a set of resources" which is used in this disclosure. Discussed herein are ways to enhance the inter-UE coordination of the "set of resources" considering DRX configuration, such that a receiver UE can share both information with a potential peer transmitter UE ("Tx UE"). Moreover, the union of DRX active time of receiver UE and a set of resources may be modified to provide opportunities for sidelink transmission. In addition, a receiver UE may have multiple DRX configuration with as many peers, which plays an important role for an effective inter-UE coordination.

Accordingly, the below solutions enhance inter-UE coordination for efficient sidelink transmission when using sidelink DRX. In one embodiment, a receiver UE (e.g., "UE-A") determines the intersection of "a set of resources" with that of the DRX active time aligned with another UE (e.g., "UE-B") and signals this intersection to the UE-B. This potentially gives rise to a "modified-set of resources." The transmitter UE (i.e., UE-B) upon receiving the modified set of resources, performs its resource selection from the signaled set of resources for transmission to the said receiver UE (i.e., UE-A).

In further enhancements, the UE-A may update any changes to the common active time to the UE-B. Changes to the active time of the UE-A may happen due to a number of reasons wherein the timer SL-inactivity-timer is started or restarted. In one implementation, a timer SL-inactivity-timer is started/restarted to select a resource for transmission outside its active period when the set of resources does not intersect within its own active period when the packet delay budget ("PDB") allows, and the reliability of the packet transmission is high.

FIG. 1 depicts a wireless communication system 100 for inter-UE coordination when using SL DRX, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the Fifth-Generation ("5G") cellular system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals carried over the wireless communication links 123. Furthermore, the UL communication signals may comprise one or more downlink channels, such as the Physical Uplink Control Channel ("PUCCH") and/or Physical Uplink Shared Channel ("PUSCH"), while the DL communication signals may comprise one or more downlink channels, such as the Physical Downlink Control Channel ("PDCCH") and/or Physical Downlink Shared Channel ("PDSCH"). Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. The wireless communication links 123 may be any suitable carrier in licensed or unlicensed radio spectrum. The wireless communication links 123 facilitate communication between one or more of the remote units 105 and/or one or more of the base units 121. Note that during NR operation on unlicensed spectrum (referred to as "NR-U"), the base unit 121 and the remote unit 105 communicate over unlicensed (i.e., shared) radio spectrum.

In one embodiment, the mobile core network 140 is a 5G Core network ("5GC") or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO") and/or Public Land Mobile Network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, a Unified Data Management function ("UDM") and a User Data Repository ("UDR"). In some embodiments, the UDM is co-located with the UDR, depicted as combined entity "UDM/UDR" 149. Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network ("DN"), in the 5G architecture. The AMF 143 is responsible for termi-nation of Non-Access Spectrum ("NAS") signaling, NAS ciphering & integrity protection, registration management, connection management, mobility management, access authentication and authorization, security context manage-ment. The SMF 145 is responsible for session management (i.e., session establishment, modification, release), remote unit (i.e., UE) Internet Protocol ("IP") address allocation & management, DL data notification, and traffic steering con-figuration of the UPF 141 for proper traffic routing.

The PCF 147 is responsible for unified policy framework, providing policy rules to CP functions, access subscription information for policy decisions in UDR. The UDM is responsible for generation of Authentication and Key Agree-ment ("AKA") credentials, user identification handling, access authorization, subscription management. The UDR is a repository of subscriber information and may be used to service a number of network functions. For example, the UDR may store subscription data, policy-related data, sub-scriber-related data that is permitted to be exposed to third party applications, and the like.

In various embodiments, the mobile core network 140 may also include a Network Repository Function ("NRF") (which provides Network Function ("NF") service registra-tion and discovery, enabling NFs to identify appropriate services in one another and communicate with each other over Application Programming Interfaces ("APIs")), a Net-work Exposure Function ("NEF") (which is responsible for making network data and resources easily accessible to customers and network partners), an Authentication Server Function ("AUSF"), or other NFs defined for the 5GC. When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "net-work slice" refers to a portion of the mobile core network 140 optimized for a certain traffic type or communication service. For example, one or more network slices may be optimized for enhanced mobile broadband ("eMBB") ser-vice. As another example, one or more network slices may be optimized for ultra-reliable low-latency communication ("URLLC") service. In other examples, a network slice may be optimized for machine-type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

In various embodiments, the remote units 105 may com-municate directly with each other (e.g., device-to-device communication) using sidelink ("SL") communication sig-nals 115. Here, SL transmissions may occur on SL resources, for example on the Physical Sidelink Control Channel ("PSCCH"), Physical Sidelink Feedback Channel ("PSFCH"), and/or Physical Sidelink Shared Channel ("PSSCH").

While FIG. 1 depicts components of a 5G RAN and a 5G core network, the described embodiments for inter-UE coor-dination when using SL DRX apply to other types of communication networks and RATs, including IEEE 802.11 variants, Global System for Mobile Communications ("GSM", i.e., a 2G digital cellular network), General Packet Radio Service ("GPRS"), Universal Mobile Telecommuni-cations System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobil-ity Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term ""UE" is used for the mobile station/remote unit, but it is replaceable by any other remote device, e.g., remote unit, MS, ME, Customer Premise Equipment ("CPE"), etc. Further, the operations are described mainly in the context of 5G NR. However, the below described solutions/methods are also equally appli-cable to other mobile communication systems for inter-UE coordination when using SL DRX.

In duplex communication, the connected entities (e.g., UEs) are able to communicate with one another in both directions, i.e., the duplex UE can both transmit and receive. Duplex communication can be grouped into two types: full-duplex and half-duplex. In a full-duplex system, both entities (UEs) can communicate with each other simultane-ously, i.e., the devices can transmit while simultaneously receiving. However, in a half-duplex system, both entities (UEs) can transmit and receive, but not simultaneously.

In LTE and NR, sidelink communication is a half-duplex scheme. Accordingly, when a first sidelink UE (denoted "UE-1") transmits during a given time slot, it cannot receive a transmission from a second sidelink UE (denoted "UE-2") that is made during the same time slot. Similarly, the UE-2 cannot receive the transmission from UE-1 due to the two sidelink UE transmitting during the same time slot. Note, however, that a third sidelink UE (denoted "UE-3") is able to receive both the UE-1's transmission and the UE-2's transmission during the same time slot when the UE-1 uses a different frequency resource to transmit than the UE-2.

Moreover, traditional schemes for sidelink communica-tion assume that peer UEs are perpetually available for reception and transmission and therefore only find suitable resources using Inter-UE coordination given a packet delay budget ("PDB") constraint. However, if the peer UEs use a DRX configuration to save power, then the peer UEs are not perpetually available for reception and transmission, thus disrupting Inter-UE coordination.

Therefore, to enhance Inter-UE coordination, the peer UE behavior is modified to use an intersection of sidelink DRX configuration and the set of resources available for sidelink communication. The below solutions for inter-UE coordination describe behavior of Rx UE and Tx UE (e.g., UE-A and UE-B, respectively) when the DRX configuration is modified, or an active duration changed (through restart of an inactive period timer as an example).

In one embodiment, the UE-A determines and signals the intersection of "A set of resources" with that of the DRX active time aligned with UE-B. This potentially gives rise to a "modified-set of resources." The transmitter upon receiving the modified set of resources, performs its resource selection from the signaled set of resources for transmission to the said receiver UE.

In an enhancement to the above embodiment, the UE-A updates any changes to its common active time to the UE-B. Changes to the active time of the UE-A may happen due to a number of reasons wherein the timer SL-inactivity-timer is started/restarted at one or more occasions (i.e., trigger conditions) described in detail below.

In one implementation, the timer SL-inactivity-timer is started/restarted to select a resource for transmission outside its active period when the set of resource does not intersect within its own active period when PDB allows and the reliability of the packet transmission is high.

For all solution embodiments present in this disclosure, it is assumed that the peer sidelink UEs have arrived at a DRX configuration between them and therefore it is clear when each of the peers is available for transmission and reception.

Figure 2:
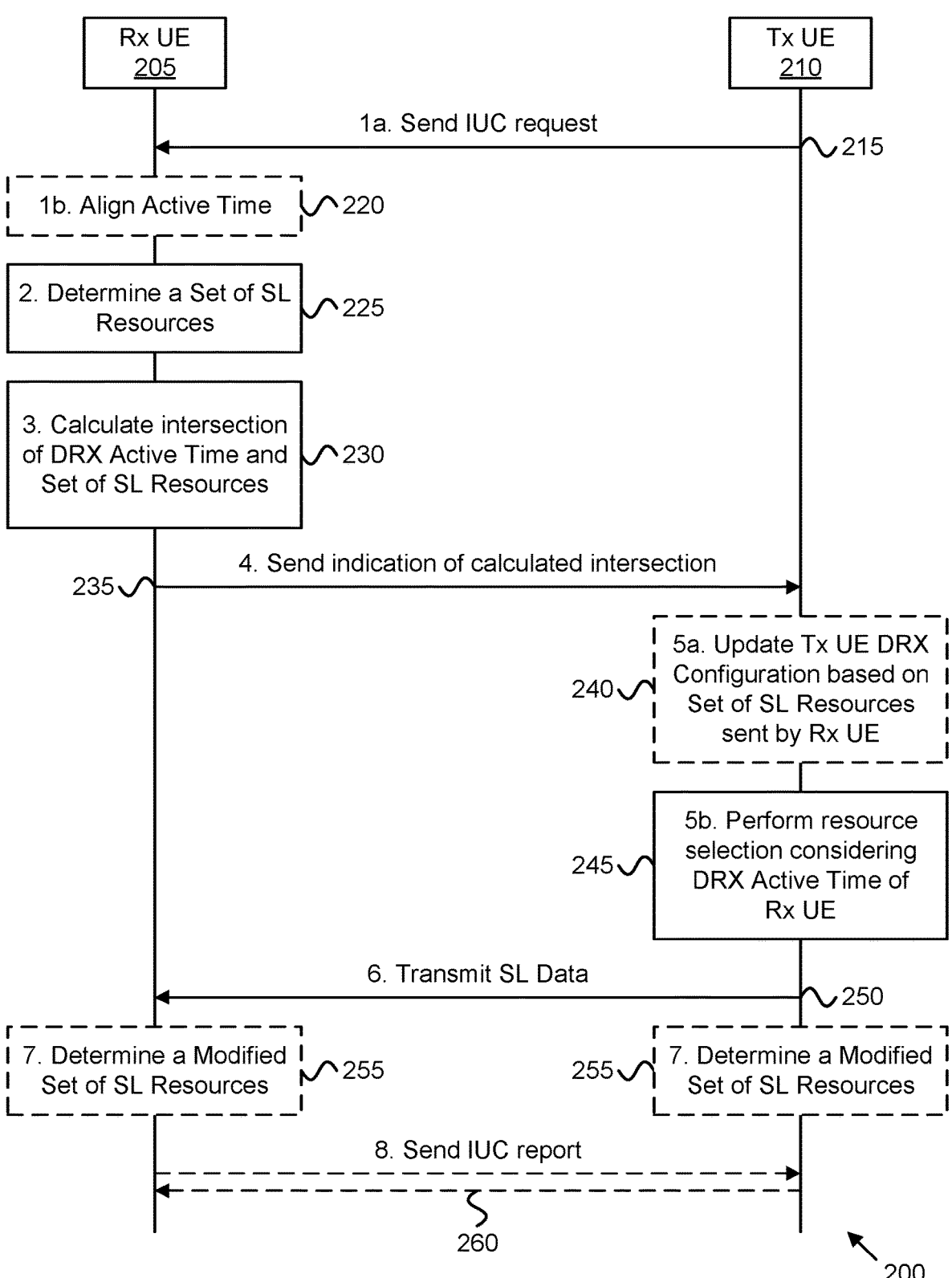
FIG. 2 is a call-flow diagram illustrating one embodiment of inter-UE coordination when using SL DRX.

FIG. 2 depicts exemplary message flow of a procedure 200 for @, according to embodiments of the first solution. The procedure 200 involves a first sidelink UE, denoted Rx UE 205, and a sidelink second UE, denoted Tx UE 210, each of which may be an embodiment of the remote unit 105.

The procedure 200 begins at Step 1a as the Tx UE 210 sends an Inter-UE Coordination ("IUC") request to the Rx UE 205 (see messaging 215).

At Optional Step 1b, when the Rx UE 205 is aware of the DRX configuration of the Tx UE 210, the Rx UE 205 may align its own DRX Active Time with that of the Tx UE 210 (see block 220). As described in greater detail below, the DRX configurations include an Active Time during which sidelink data is to be exchanged with peer UEs. Accordingly, the Active Time comprises a common active period aligned between the Rx UE 205 and the Tx UE 210.

At Step 2, the Rx UE 205 determines a Set of sidelink resources (see block 225). In some embodiments, the Rx UE determines the Set of sidelink resources by performing a sensing procedure and a sidelink resource selection procedure. Sensing results may be the averaged Reference Signal Received Power ("RSRP") (alternatively, or additionally, the averaged Reference Signal Received Quality ("RSRQ") and/or Signal to Interference and Noise Ratio ("SINR")) from the sensing slots for the candidate resource selection by considering the common active period between the Rx UE 205 and the Tx UE 210. Here, the determined Set of sidelink resources may include a preferable resource based on a sensing result, a non-preferable resource based on the sensing result, and/or a resource having a potential collision.

At Step 3, the Rx UE 205 calculates an intersection of its DRX Active Time and the Set of sidelink resources (see block 230).

At Step 4, the Rx UE 205 sends an indication of the calculated intersection to the Tx UE 210 (see messaging 235).

At Optional Step 5a, the Tx UE 210 may align its DRX configuration based on the Set of sidelink resources indicated by the Rx UE 205 (see block 240).

At Step 5b, the Tx UE 210 performs resource selection considering the DRX Active Time of the Rx UE 205 (see block 245). In various embodiments, the Tx UE 210 selects an initial transmission resource only in the Rx UE 205's active time, i.e., where any of the SL DRX timers (e.g., at least on-duration timer) are already running or will be running (e.g., are guaranteed to be running) in the future. Examples of SL DRX timers include the on-duration-timer, the SL-inactivity-timer, and other known timers as define in 3GPP TS 38.321.

Note that a DRX configuration for sidelink includes an on-duration, also referred to as "active time," that repeats with a certain periodicity. The on-duration begins at a known point in time and the DRX timer on-duration-timer (having a known duration) is started. The sidelink UE remains active while the on-duration-timer is running, i.e., until expiry of the on-duration-timer. The on-duration-timer runs periodically and therefore is guaranteed to run at points in time known to the Tx UE 210.

At Step 6, the Tx UE 210 transmits sidelink data to the Rx UE 205 using the selected resources (see messaging 250). As indicated above, this may be an initial transmission of the sidelink data. In other embodiments, the Tx UE 210 may retransmit sidelink data to the Rx UE 205 using the selected sidelink resources.

At Optional Step 7 the Rx UE 205 and/or the Tx UE 210 may determine a modified set of sidelink resources (see block 255). Various trigger conditions for this determination are described below.

At Conditional Step 8, upon determining a modified set of sidelink resources, the determining UE (i.e., Rx UE 205 and/or Tx UE 210) sends an IUC report to its peer UE(s), where the IUC report indicates the modified set of sidelink resources (see messaging 260). Thereafter, the peer UE(s) consider the modified set of sidelink resources when performing resource selection for sidelink communication with the reporting UE.

Figure 3:
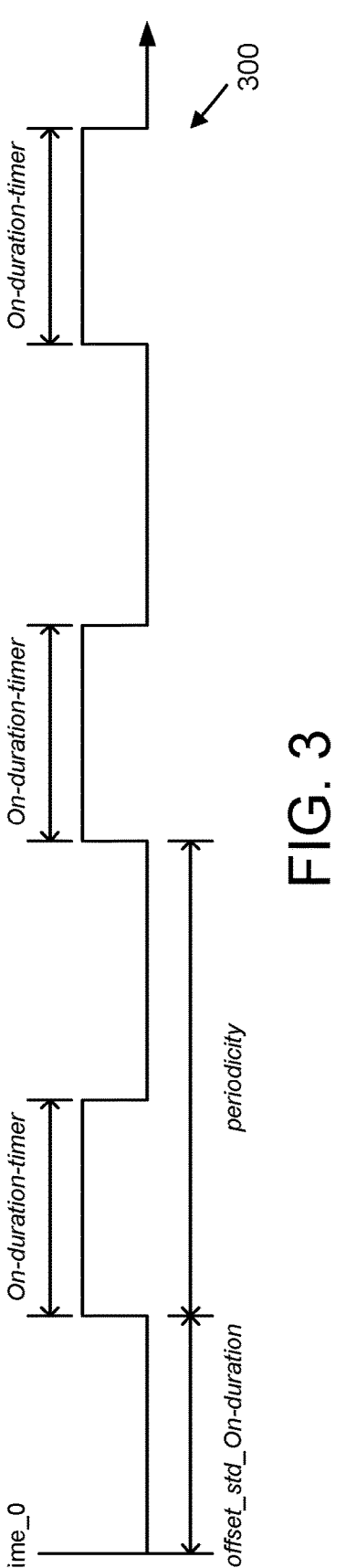
FIG. 3 is a diagram illustrating one embodiment of time-domain activity of a sidelink DRX configuration.

FIG. 3 depicts an example of a sidelink discontinuous reception ("SL DRX") configuration 300, according to embodiments of the disclosure. Here, an example SL DRX configuration 300 is defined as a combination of {offset_std_On-duration, On-duration-timer and periodicity}. A standard SL On-duration is started at a known point in time and a SL UE remains active until a DRX timer called On-duration-timer is miming Standard SL On-duration starts at a fixed time offset (called offset_std_On-duration) from Time_0 based on a sync source from GNSS, or gNB directly, or indirectly from SLSS. The DRX timer On-duration-timer is restarted periodically with a periodicity.

It should be noted that the term "active time" refers to the time period where a SL UE transmits and receives data on the PC5 interface, different compared to the Uu ActiveTime which is only referring to the time period where UE is monitoring PDCCH. SL-DRX-configuration is defined as a combination of {offset_std_On-duration, On-duration-timer and periodicity} as shown in FIG. 3, and is known per service, application type, i.e., to 3GPP it is known in terms of QoS class (e.g., PC5 QoS Indicator ("PQI") or PQI-range). For a UE interested in a particular service, it will be clear which DRX configuration to apply.

There could be other possibilities and examples of side-link DRX configuration and how the peer UEs are config-ured with the same: two separate sidelink DRX configura-tions each for transmission and reception of a given UE; or sidelink DRX configuration provided by a gNB to peer UEs. In the following descriptions, the term DRX configuration or active time (on duration) is used to denote the time period where a receiver UE is available for receiving from a corresponding transmitter. Here, it should be noted that a given UE may have multiple DRX configurations, one with each different peer UEs.

According to embodiments of a first solution, the UE-A determines "a set of resources" (as defined above) to be signaled to the UE-B, considering the common DRX Active time of the DRX Cycle in use between the peer UEs. In some embodiments, the UE-A may perform a resource selection procedure by using a certain window (e.g., a common active period between the UE-A and the UE-B) for estimating the averaged RSRP from the sensing slots for the candidate resource selection by considering the common active period between the UE-A and the UE-B. As noted above, the UE-A may be mapped to a Rx UE and the UE-B may be mapped to a Tx UE.

In some embodiments of the first solution, the UE-A implements one or more known procedures to determine which resources are good for reception purpose. Examples of resources that are good for reception purpose include, but are not limited to: resources where the UE-A does not intend to transmit in future, resources that emerge as the best possibilities after the sensing procedure (e.g., have low energy reception (e.g., RSRP) in the past 1000 ms or so) and/or resources that are relatively free and not indicated as reserved/to-be-used in future time period (e.g., a period of 100 ms into the future), or the like.

Based on the above information, the UE-A may run a resource selection procedure and share the result with the UE-B, i.e., indicating one or more of: 1) which resources are preferred for reception, 2) which resource are not preferred for reception, 3) resources where some collisions are fore-seen, etc. As part of the first solution, the resource selection is only done for the common DRX Active time of the DRX Cycle in use between the peer UEs.

In one implementation of the first solution, the UE-A determines the set of resource within the DRX active time using the procedure for determining the subset of resources to be reported to higher layers in sidelink resource allocation mode 2, e.g., as described in 3GPP TS 38.214, where higher layer input parameter (e.g., from MAC layer to PHY layer) may additionally contain the common active time period aligned between the UE-A and the UE-B, so that the UE-A determines the set of resource based on this common active period.

As an example, the sensing window that is used for generating a set of resource by UE-A is to be overlapped with the common active period of the UE-A and the UE-B. So, in this case, the input parameter for generating the candidate resource selection and candidate exclusion is the common active period. The resource trigger (or re-trigger) for further specifying the sensing operation is performed for the data transmission, or for the selection of a set of resource, and the reporting of a configurable candidate set reporting is to be consider for the set of resource compared to the candidate set reporting for the data transmission.

In another implementation of the first solution, if the UE-A does not find a suitable amount (e.g., at least a fixed/predetermined percentage) of candidate resources within the common active period, the UE-A may transmit the preferred resource outside the active period based on the earliest in time rule. In such embodiments, the UE-B may extend its inactivity timer based on the preferred set. Alter-natively, the UE-B may drop the assistance information based on the priority and PDB budget of the data transmis-sion.

In an alternate embodiment of the first solution, the resulting resources are potentially different from "a set of resources" that UE-A would otherwise arrive at, had it not taken into consideration the common Active time of the DRX Cycle in use between the UE-A and the peer UE-B. As such, said resulting resources may be referred to as a "modified set of resources." Upon receiving the modified set of resources, the UE-B (e.g., a Tx UE) performs its resource selection from the signaled set of resources for transmission to the receiver UE-A.

In one implementation, the UE-B performs random resource selection after receiving the set of resource for transmission to the UE-A. In another implementation, the UE-B performs joint resource selection by combining its own candidate resource set based on its sensing operation with that of the received set of resources. As a further implementation, the MAC layer of the UE-B may generate a set of resources from the reported candidate report set from lower layer (i.e., PHY layer) based on the common active period between the UE-A and the UE-B.

According to embodiments of a second solution (i.e., an alternative to the first solution), the UE-A determines and signals only the "a set of resources" based on its own active period (i.e., the UE-A does not consider the active period of the UE-B in this second solution). The UE-B upon receiving the set of resource from the UE-A, further determines an intersection of the signaled set of resource with the DRX active time that is known to be used by the UE-A for reception purpose.

According to one implementation, the UE-A and the UE-B update their established DRX configuration, e.g., aligned DRX Active Time, based on the signaled "set of resources." For example, for cases when the UE-A sends to the UE-B the set of resources not preferred for UE-B's transmission, the UE-A and the UE-B can both remove the indicated set of resources from their established DRX Active Time. Note that such behavior can further help to optimize the power consumption at the peer UEs.

According to embodiments of a third solution, the previ-ous two solutions may be enhanced wherein the UE-A updates any changes to the common active time to the UE-B. In one implementation, the inactive period timer SL-inac-tivity-timer is started (or restarted) to select a resource for transmission outside the UE-A's active period when the set of resource does not intersect within its own active period, i.e., when allowed by the PDB and when the reliability of the packet transmission is high. Restart of the inactive period timer may modify the DRX configuration and/or change the active duration. Note that the inactive period timer SL-inactivity-timer is not related to and is not affected by transmission of a new TB.

Note that changes to the active time of the UE-A may happen due to a number of reasons wherein the SL-inactiv-ity-timer is started (or restarted) at one or more of the occasions enumerated below.

when indicating NACK on PUCCH to request a re-transmission grant when indicating ACK on PUCCH and having a non-empty SL buffer when it receives the HARQ feedback on PSFCH (as an alternative, in this case the UE-A and the UE-B can both autonomously prolong their Active Time, e.g., by starting/restarting some timer; hence, there is no need to signal from UE-A to UE-B)

when transmitting Sidelink Scheduling Request ("SL-SR") and/or Sidelink Buffer Status Report ("SL-BSR") to the gNB when requesting a Channel State Information ("CSI") report on SL from a peer UE (as an alternative, in this case the UE-A and the UE-B can both autonomously prolong their Active Time, e.g., by starting/restarting some timer; hence, there is no need to signal from UE-A to UE-B)

when having received a request for CSI-report on SL from a peer UE when receiving SCI (e.g., on PSCCH) optionally containing a relevant Layer-2 Source Identifier ("SRC L2ID") and/or Layer-2 Destination Identifier ("DST L2ID")—e.g., as defined in 3GPP TS 38.321 when receiving data (e.g., PSSCH)

when sending a PSFCH NACK Feedback when transmitting SCI (e.g., PSCCH) requesting SL PSFCH feedback when transmitting non-last SCI (e.g., PSCCH) in case of Blind re-transmissions when transmitting non-last data (e.g., PSSCH) in case of Blind re-transmissions when a sync source uses an infinite (or a very long) value of SL-inactivity-timer In one embodiment, the UE-A computes afresh "modified-set of resources" and signals the same to the UE-B. In another embodiment, the UE-A signals just the new common active time and optionally an updated "a set of resources" to the UE-B. In the latter case, the UE-B, upon receiving the new common active time, determines the intersection with the updated active time and the most recently received "a set of resources." Hence, the third solution allows new conditional triggers for sending an IUC report from the UE-A to the UE-B.

According to embodiments of a fourth solution, the UE-A indicates that it is active ALL the time to the UE-B and shares only the "A set of resources," with the given UE-B.

According to embodiments of a fifth solution, a receiver UE shares active time information from DRX configuration of other peer UEs with the given transmitter UE. The receiver UE otherwise behaves as described in the third solution.

In an example scenario, a third sidelink UE, denoted "UE-C," that is peer of the UE-A may be operating in the radio shadow of the UE-B. Consequently, the UE-B would be unaware of an active time and/or a set of resources available to the UE-C. By the UE-A sharing with the UE-B the active time information from DRX configuration of other peer UEs (i.e., the UE-C), the UE-B is able to coordinate its sidelink transmissions so as not to interfere with sidelink communication between the UE-A and the UE-C.

According to embodiments of a sixth solution, the UE-A further shares a periodic pattern of time, a subset of common DRX configuration with the given UE-B. The subset of common DRX configuration is indeed a refined or modified DRX configuration arrived at using "a set of resources," or alternatively "modified active time," and provides better power saving opportunities. Note that the second and sixth solutions may be combined to better optimize power savings opportunities of the peer UEs.

Figure 4:
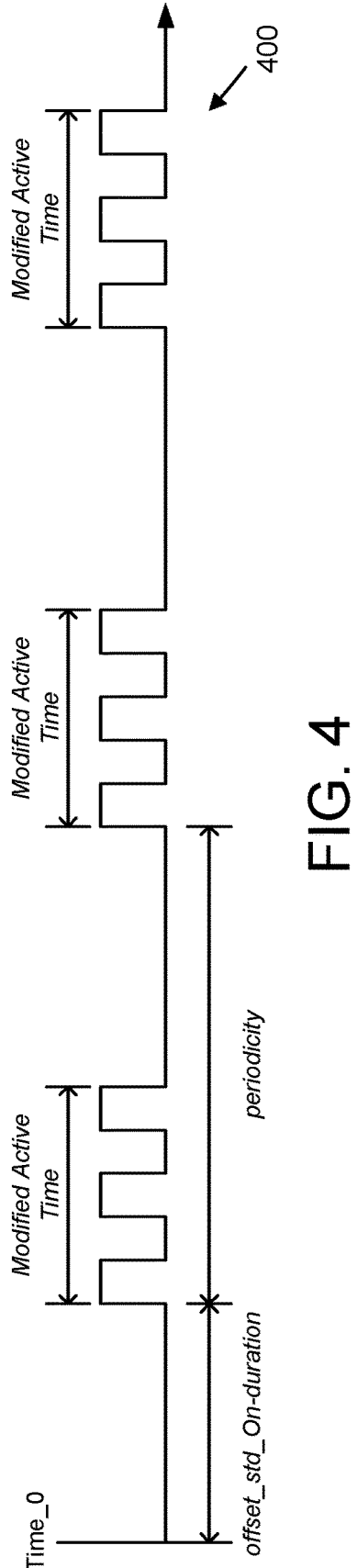
FIG. 4 is a diagram illustrating one embodiment of modified time-domain activity of a sidelink DRX configuration when inter-UE coordination occurs.

FIG. 4 depicts an example of a SL DRX configuration 400 using a modified active time, according to the sixth solution. As depicted, the modified active time includes power-saving periods during the on-duration (i.e., times when the receiver UE is not available to receive sidelink communications). Accordingly, a transmitter UE (e.g., UE-B) takes this DRX cycle information (particularly, its corresponding modified active time) and performs its resource selection from the signaled set of resources for transmission to the said receiver UE (e.g., UE-A).

Figure 5:
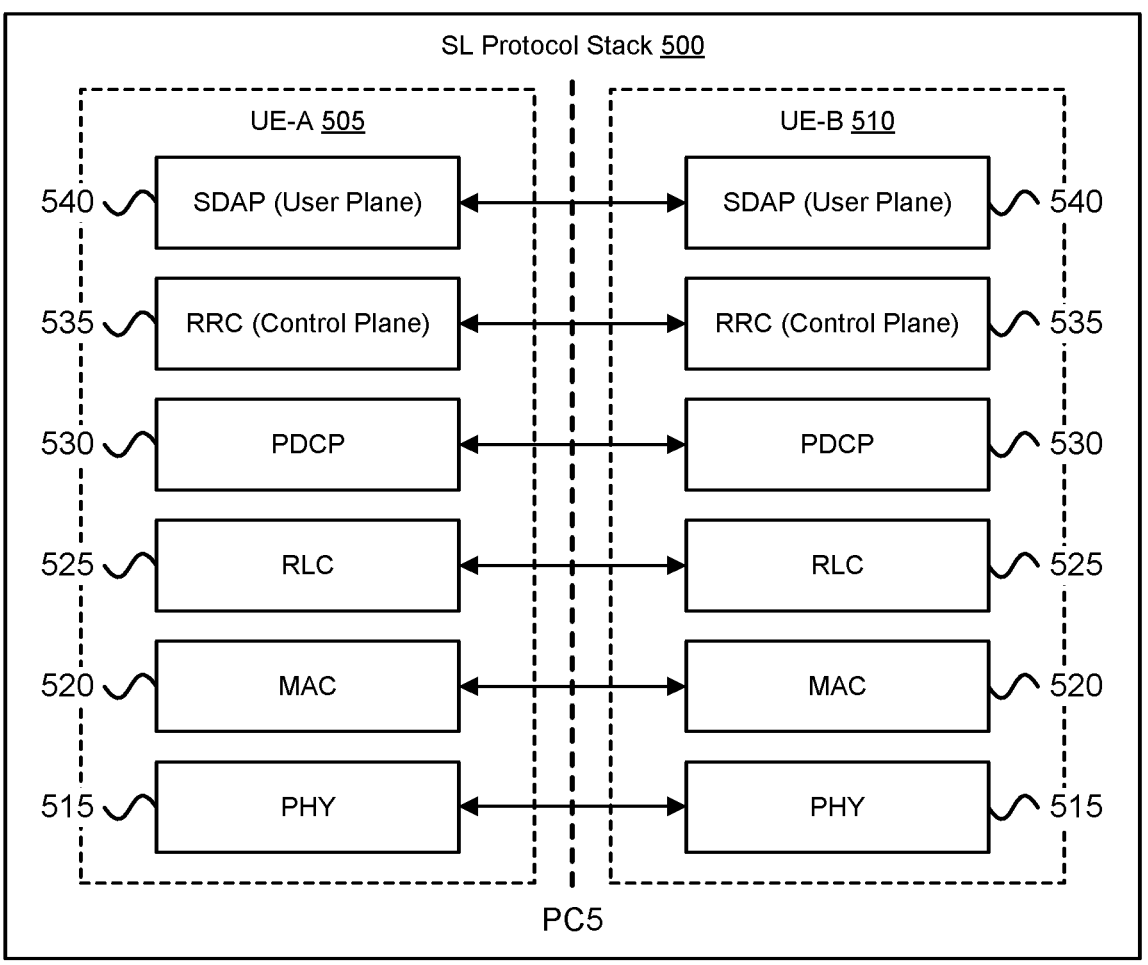
FIG. 5 is a block diagram illustrating one embodiment of a sidelink protocol stack.

FIG. 5 depicts a SL protocol stack 500, according to embodiments of the disclosure. While FIG. 5 shows a UE-A 505 and a UE-B 510, these are representative of a set of UEs using sidelink communication over a PC5 interface; other embodiments may involve different SL UEs. In various embodiments, each of the UE-A 505 and UE-B 510 may be an embodiment of the remote unit 105. In some embodiments, the UE-A 505 is an embodiment of the Rx UE 205, and the UE-B 510 is an embodiment of the Tx UE 210.

As depicted, the SL protocol stack (i.e., PC5 protocol stack) includes a physical ("PHY") layer 515 (also known as Layer-1 or "L1"), a Media Access Control ("MAC") sublayer 520, a Radio Link Control ("RLC") sublayer 525, a Packet Data Convergence Protocol ("PDCP") sublayer 530, a Service Data Adaptation Protocol ("SDAP") layer 535 (e.g., for the user plane), and a Radio Resource Control ("RRC") layer 540 (e.g., for the control plane). There may be additional layers above the RRC and SDAP layers, such as an application layer (not shown).

The Access Stratum ("AS") layer (also referred to as "AS protocol stack") for the control plane in the PC5 interface consists of at least RRC, PDCP, RLC and MAC sublayers, and the physical layer. The AS layer (also referred to as "AS protocol stack") for the user plane in the PC5 interface consists of at least SDAP, PDCP, RLC and MAC sublayers, and the physical layer.

The Layer-1 ("L1") refers to the PHY layer 515. The Layer-2 ("L2") is split into the SDAP, PDCP, RLC and MAC sublayers. The Layer-3 ("L3") includes the RRC sublayer and the NAS layer for the control plane and includes, e.g., an Internet Protocol ("IP") layer or PDU Layer (not depicted) for the user plane. L1 and L2 are generally referred to as "lower layers," while L3 and above (e.g., transport layer, Vehicle-to-Everything ("V2X") layer, application layer) are referred to as "higher layers" or "upper layers."

The physical layer 515 offers transport channels to the MAC sublayer 520. The MAC sublayer 520 offers logical channels to the RLC sublayer 525. The RLC sublayer 525 offers RLC channels to the PDCP sublayer 530. The PDCP sublayer 530 offers radio bearers to the SDAP sublayer 535 and/or RRC layer 540. The SDAP sublayer 535 offers QoS flows to higher layers. The RRC layer 540 manages the establishment, configuration, maintenance, and release of Signaling Radio Bearers ("SRBs") and Data Radio Bearers ("DRBs").

In some embodiments, the PHY layer 515 determines the common active period between peer UEs and/or identifies the intersection between active time and the determined set of (sidelink) resources. As mentioned above, the PHY layer 515 may receive parameters and/or indication from the MAC layer 520. In other embodiments, MAC layer 520 may determine the common active period between peer UEs and/or identify the intersection between active time and the determined set of (sidelink) resources, where the MAC layer 520 receives parameters and/or indications from the PHY layer 515.

Figure 6:
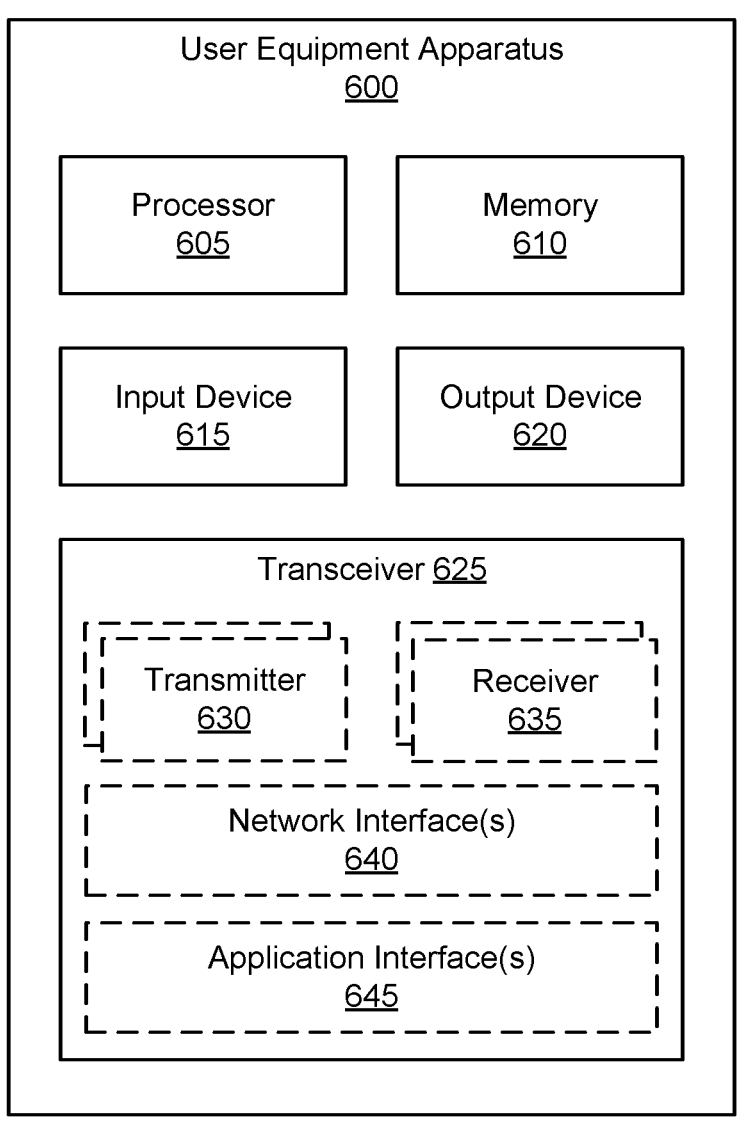
FIG. 6 is a block diagram illustrating one embodiment of a user equipment apparatus that may be used for inter-UE coordination when using SL DRX.

FIG. 6 depicts a user equipment apparatus 600 that may be used for inter-UE coordination when using SL DRX, according to embodiments of the disclosure. In various embodiments, the user equipment apparatus 600 is used to implement one or more of the solutions described above. The user equipment apparatus 600 may be one embodiment of the remote unit 105, the Rx UE 205, the Tx UE 210, the UE-A, and/or the UE-B, described above. Furthermore, the user equipment apparatus 600 may include a processor 605, a memory 610, an input device 615, an output device 620, and a transceiver 625.

In some embodiments, the input device 615 and the output device 620 are combined into a single device, such as a touchscreen. In certain embodiments, the user equipment apparatus 600 may not include any input device 615 and/or output device 620. In various embodiments, the user equipment apparatus 600 may include one or more of: the processor 605, the memory 610, and the transceiver 625, and may not include the input device 615 and/or the output device 620.

As depicted, the transceiver 625 includes at least one transmitter 630 and at least one receiver 635. In some embodiments, the transceiver 625 communicates with one or more cells (or wireless coverage areas) supported by one or more base units 121. In various embodiments, the transceiver 625 is operable on unlicensed spectrum. Moreover, the transceiver 625 may include multiple UE panels supporting one or more beams. Additionally, the transceiver 625 may support at least one network interface 640 and/or application interface 645. The application interface(s) 645 may support one or more APIs. The network interface(s) 640 may support 3GPP reference points, such as Uu, N1, PC5, etc. Other network interfaces 640 may be supported, as understood by one of ordinary skill in the art.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the processor 605 controls the user equipment apparatus 600 to implement the above described UE behaviors. In certain embodiments, the processor 605 may include an application processor (also known as "main processor") which manages application-domain and operating system ("OS") functions and a baseband processor (also known as "baseband radio processor") which manages radio functions.

In various embodiments, the user equipment apparatus 600 is a receiver UE (e.g., the Rx UE 205 and/or UE-A) that communicates with a peer transmitter UE ("Tx UE") using sidelink communication resources, as described herein. In such embodiments, the processor 605 controls the user equipment apparatus 600 to perform the above described Rx UE and/or UE-A behaviors.

In some embodiments, the processor 605 determines a DRX configuration that is to be used towards the peer Tx UE, where the DRX configuration includes an active time during which sidelink data is exchanged with the peer Tx UE. In some embodiments, the DRX configuration active time includes a time where any sidelink DRX timer is already running or is to run (e.g., is guaranteed to run) in the future.

The processor 605 determines a set of resources for sidelink communication and identifies an intersection of the active time and the set of resources. The transceiver 625 transmits to the peer Tx UE (i.e., over a sidelink radio interface) an indication of the identified intersection of the active time and the set of resources.

In some embodiments, the transceiver 625 receives a request for IUC from the peer Tx UE. In such embodiments, the indication of the identified intersection is transmitted in response to the IUC request. In some embodiments, determining the set of resources includes receiving at a MAC layer a candidate report from a physical layer, wherein the MAC layer identifies the intersection of the active time and the set of resources.

In some embodiments, the processor 605 determines the set of resources by performing a sensing procedure and a sidelink resource selection procedure, where the determined set of resources includes at least one of: a preferable resource based on a sensing result, a non-preferable resource based on the sensing result, and a resource having a potential collision. In various embodiments, the sensing results may be the averaged RSRP from the sensing slots for the candidate resource selection by considering the common active period between the apparatus 600 and the Tx UE.

In some embodiments, the active time includes a common active period aligned between the apparatus 600 and the peer Tx UE. In certain embodiments, the processor 605 receives a higher layer parameter (i.e., from MAC layer) that indicates the common active period. In certain embodiments, when an amount of intersecting candidate resources in the common active period is less than a predetermined amount (i.e., when the processor 605 does not find a suitable amount, e.g., some fixed percentage, of candidate resource set within the common active period), then transmitting the indication of the identified intersection includes transmitting a preferred resource outside the common active period.

In some embodiments, the processor 605 determines a modified set of resources and the transceiver 625 sends an IUC report to the peer Tx UE, where the IUC report contains the modified set of resources. As described above, the processor 605 may determine the modified set or resources in response to one of more of the following triggers: when indicating a NACK on PUCCH, i.e., to request a re-transmission grant, when transmitting a sidelink scheduling request to a serving RAN, and/or when transmitting a sidelink buffer status report to the serving RAN. Note that NACK refers to HARQ-ACK feedback, e.g., sent to gNB on PUCCH. As used herein, "HARQ-ACK" may represent collectively the Positive Acknowledge ("ACK") and the Negative Acknowledge ("NACK") and Discontinuous Transmission ("DTX"). ACK means that a Transport Block ("TB") is correctly received while NACK (or NAK) means a TB is erroneously received and DTX means that no TB was detected. Note that SL HARQ-ACK feedback may be sent from a Rx UE to the Tx UE.

In various embodiments, the user equipment apparatus 600 is a transmitter UE (e.g., the Tx UE 210 and/or UE-B) that communicates with a peer receiver UE ("Rx UE") using sidelink communication resources, as described herein. In such embodiments, the processor 605 controls the user equipment apparatus 600 to perform the above described Tx UE and/or UE-B behaviors.

In some embodiments, the transceiver 625 receives from the peer Rx UE (i.e., over a sidelink radio interface) an indication of an intersection of a set of resources for sidelink communication and a DRX configuration active time during which sidelink data is to be exchanged with the peer Rx UE.

The processor 605 performs resource selection from the set of resources for an initial transmission to the peer Rx UE, where the resource selection is based on the DRX configuration active time of the peer Rx UE. The transceiver 625 exchanges sidelink data with the peer Rx UE during the active time using the selected resources.

In some embodiments, the DRX configuration active time includes a time where any sidelink DRX timer is already running or is to run in the future. In some embodiments, the processor updates a DRX configuration of the apparatus 600 based on the received set of resources. In some embodiments, the DRX configuration active time includes a common active period aligned between the apparatus 600 and the peer Rx UE.

In some embodiments, the transceiver 625 sends a request for IUC, where the indication of the intersection is received in response to the IUC request. In some embodiments, the processor 605 determines a modified set of resources when requesting a sidelink CSI report from the peer Rx UE and the transceiver 625 sends an IUC report to the peer Rx UE, where the IUC report includes the modified set of resources.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to inter-UE coordination when using SL DRX and/or mobile operation. For example, the memory 610 may store various parameters, panel/beam configurations, resource assignments, policies, and the like as described above. In certain embodiments, the memory 610 also stores program code and related data, such as an operating system or other controller algorithms operating on the apparatus 600.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 620 may include a wearable display separate from, but communicatively coupled to, the rest of the user equipment apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

The transceiver 625 communicates with one or more network functions of a mobile communication network via one or more access networks. The transceiver 625 operates under the control of the processor 605 to transmit messages, data, and other signals and also to receive messages, data, and other signals. For example, the processor 605 may selectively activate the transceiver 625 (or portions thereof) at particular times in order to send and receive messages.

The transceiver 625 includes at least transmitter 630 and at least one receiver 635. One or more transmitters 630 may be used to provide UL communication signals to a base unit 121, such as the UL transmissions described herein. Similarly, one or more receivers 635 may be used to receive DL communication signals from the base unit 121, as described herein. Although only one transmitter 630 and one receiver 635 are illustrated, the user equipment apparatus 600 may have any suitable number of transmitters 630 and receivers 635. Further, the transmitter(s) 630 and the receiver(s) 635 may be any suitable type of transmitters and receivers. In one embodiment, the transceiver 625 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 625, transmitters 630, and receivers 635 may be implemented as physically separate components that access a shared hardware resource and/or software resource, such as for example, the network interface 640.

In various embodiments, one or more transmitters 630 and/or one or more receivers 635 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 630 and/or one or more receivers 635 may be implemented and/or integrated into a multi-chip module. In some embodiments, other components such as the network interface 640 or other hardware components/circuits may be integrated with any number of transmitters 630 and/or receivers 635 into a single chip. In such embodiment, the transmitters 630 and receivers 635 may be logically configured as a transceiver 625 that uses one more common control signals or as modular transmitters 630 and receivers 635 implemented in the same hardware chip or in a multi-chip module.

Figure 7:
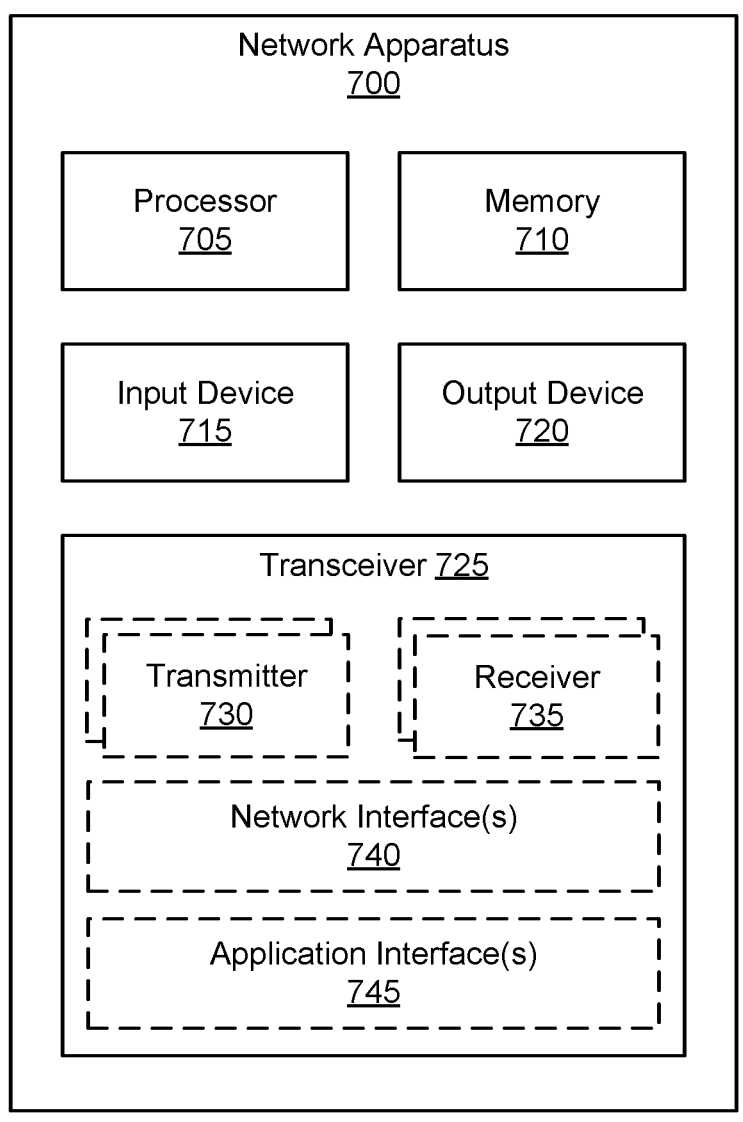
FIG. 7 is a block diagram illustrating one embodiment of a network apparatus that may be used for inter-UE coordination when using SL DRX.

FIG. 7 depicts a network apparatus 700 that may be used for inter-UE coordination when using SL DRX, according to embodiments of the disclosure. In one embodiment, network apparatus 700 may be one implementation of a RAN entity used to implement one or more of the above solutions. The network apparatus 700 may be one embodiment of the base unit 121, as described above. Furthermore, the network apparatus 700 may include a processor 705, a memory 710, an input device 715, an output device 720, and a transceiver 725.

In some embodiments, the input device 715 and the output device 720 are combined into a single device, such as a touchscreen. In certain embodiments, the network apparatus 700 may not include any input device 715 and/or output device 720. In various embodiments, the network apparatus 700 may include one or more of: the processor 705, the memory 710, and the transceiver 725, and may not include the input device 715 and/or the output device 720.

As depicted, the transceiver 725 includes at least one transmitter 730 and at least one receiver 735. Here, the transceiver 725 communicates with one or more remote units 75. Additionally, the transceiver 725 may support at least one network interface 740 and/or application interface 745. The application interface(s) 745 may support one or more APIs. The network interface(s) 740 may support 3GPP reference points, such as Uu, N1, N2 and N3. Other network interfaces 740 may be supported, as understood by one of ordinary skill in the art.

The processor 705, in one embodiment, may include any known controller capable of executing computer-readable instructions and/or capable of performing logical operations. For example, the processor 705 may be a microcontroller, a microprocessor, a CPU, a GPU, an auxiliary processing unit, a FPGA, or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725.

In various embodiments, the network apparatus 700 is a RAN node (e.g., gNB) that communicates with one or more UEs, as described herein. In such embodiments, the processor 705 controls the network apparatus 700 to perform the above described RAN behaviors. When operating as a RAN node, the processor 705 may include an application processor (also known as "main processor") which manages application-domain and operating system ("OS") functions and a baseband processor (also known as "baseband radio processor") which manages radio functions.

In some embodiments, the processor 705 may control the transceiver to send configurations and/or resource assignments for sidelink operation to one or more UEs.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to inter-UE coordination when using SL DRX and/or mobile operation. For example, the memory 710 may store parameters, configurations, resource assignments, policies, and the like, as described above. In certain embodiments, the memory 710 also stores program code and related data, such as an operating system or other controller algorithms operating on the apparatus 700.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display separate from, but communicatively coupled to, the rest of the network apparatus 700, such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, the output device 720 may be located near the input device 715.

The transceiver 725 includes at least transmitter 730 and at least one receiver 735. One or more transmitters 730 may be used to communicate with the UE, as described herein. Similarly, one or more receivers 735 may be used to communicate with network functions in the Public Land Mobile Network ("PLMN") and/or RAN, as described herein. Although only one transmitter 730 and one receiver 735 are illustrated, the network apparatus 700 may have any suitable number of transmitters 730 and receivers 735. Further, the transmitter(s) 730 and the receiver(s) 735 may be any suitable type of transmitters and receivers.

FIG. 8 depicts one embodiment of a method 800 for inter-UE coordination when using SL DRX, according to embodiments of the disclosure. In various embodiments, the method 800 is performed by a Rx UE, such as the remote unit 105, the Rx UE 205, the UE-A, the UE-A 505, and/or the user equipment apparatus 600, described above as described above. In some embodiments, the method 800 is performed by a processor, such as a microcontroller, a microprocessor, a CPU, a GPU, an auxiliary processing unit, a FPGA, or the like.

The method 800 begins and determines 805 a DRX configuration that is to be used towards a peer transmitter UE, the DRX configuration including an active time during which sidelink data is exchanged with the peer transmitter UE. The method 800 includes determining 810 a set of resources for sidelink communication. The method 800 includes identifying 815 an intersection of the active time and the set of resources. The method 800 includes transmitting 820 an indication of the identified intersection to the peer transmitter UE. The method 800 ends.

FIG. 9 depicts one embodiment of a method 900 for inter-UE coordination when using SL DRX, according to embodiments of the disclosure. In various embodiments, the method 900 is performed by a Tx UE device, such as the remote unit 105, the Tx UE 210, the UE-B, the UE-B 510, and/or the user equipment apparatus 600, described above as described above. In some embodiments, the method 900 is performed by a processor, such as a microcontroller, a microprocessor, a CPU, a GPU, an auxiliary processing unit, a FPGA, or the like.

The method 900 begins and receives 905, from a peer receiver UE, an indication of an intersection of a set of resources for sidelink communication and a DRX configuration active time during which sidelink data is to be exchanged with the peer receiver UE. The method 900 includes performing 910 resource selection from the set of resources for an initial transmission to the peer receiver UE, said resource selection based on the DRX configuration active time of the peer receiver UE. The method 900 includes transmitting 915 sidelink data to the peer receiver UE during the active time using the selected resources. The method 900 ends.

Disclosed herein is a first apparatus for inter-UE coordination when using SL DRX, according to embodiments of the disclosure. The first apparatus may be implemented by a receiver UE, such as the remote unit 105, the Rx UE 205, the UE-A, the UE-A 505, and/or the user equipment apparatus 600, described above. The first apparatus includes a transceiver and a processor that determines a DRX configuration that is to be used towards a peer transmitter UE, where the DRX configuration includes an active time during which sidelink data is exchanged with the peer transmitter UE. The processor determines a set of resources for sidelink communication and identifies an intersection of the active time and the set of resources. The transceiver transmits to the peer transmitter UE an indication of the identified intersection of the active time and the set of resources.

In some embodiments, determining the set of resources includes performing a sensing procedure and a sidelink resource selection procedure, where the determined set of resources includes at least one of: a preferable resource based on a sensing result, a non-preferable resource based on the sensing result, and a resource having a potential collision.

In some embodiments, the DRX configuration active time includes a time where at least one sidelink DRX timer is already running or is to run in the future. In some embodiments, the active time includes a common active period aligned between the receiver UE and the peer transmitter UE. In certain embodiments, the processor receives a higher layer parameter that indicates the common active period.

In certain embodiments, when an amount of intersecting candidate resources in the common active period is less than a predetermined amount, then transmitting the indication of the identified intersection includes transmitting a preferred resource outside the common active period. In some embodiments, determining the set of resources includes receiving at a MAC layer a candidate report from a physical layer, wherein the MAC layer identifies the intersection of the active time and the set of resources.

In some embodiments, the processor determines a modified set of resources when indicating a NACK on PUCCH, i.e., to request a re-transmission grant. In such embodiments, the transceiver sends an IUC report to the peer transmitter UE, where the IUC report includes the modified set of resources. In some embodiments, the processor determines a modified set of resources when transmitting a sidelink scheduling request to a serving RAN. In such embodiments, the transceiver sends an IUC report to the peer transmitter UE, where the IUC report includes the modified set of resources.

In some embodiments, the processor determines a modified set of resources when transmitting a sidelink buffer status report to the serving RAN. In such embodiments, the transceiver sends an IUC report to the peer transmitter UE, where the IUC report includes the modified set of resources. In some embodiments, the transceiver receives a request for IUC from the peer transmitter UE. In such embodiments, the indication of the identified intersection is transmitted in response to the IUC request.

Disclosed herein is a first apparatus for inter-UE coordination when using SL DRX, according to embodiments of the disclosure. The first method may be performed by a receiver UE, such as the remote unit 105, the Rx UE 205, the UE-A, the UE-A 505, and/or the user equipment apparatus 600, described above. The first method includes determining a DRX configuration that is to be used towards a peer transmitter UE, the DRX configuration including an active time during which sidelink data is exchanged with the peer transmitter UE. The first method includes determining a set of resources for sidelink communication and identifying an intersection of the active time and the set of resources. The first method includes transmitting an indication of the identified intersection of the active time and the set of resources to the peer transmitter UE.

In some embodiments, determining the set of resources includes performing a sensing procedure and a sidelink resource selection procedure, where the determined set of resources includes at least one of: a preferable resource based on a sensing result, a non-preferable resource based on the sensing result, and a resource having a potential collision.

In some embodiments, the DRX configuration active time includes a time where at least one sidelink DRX timer is already running or is to run in the future. In some embodiments, the active time includes a common active period aligned between the receiver UE and the peer transmitter UE. In certain embodiments, the first method includes receiving a higher layer parameter that indicates the common active period.

In certain embodiments, when an amount of intersecting candidate resources in the common active period is less than a predetermined amount, then transmitting the indication of the identified intersection includes transmitting a preferred resource outside the common active period. In some embodiments, determining the set of resources includes receiving at a MAC layer a candidate report from a physical layer, wherein the MAC layer identifies the intersection of the active time and the set of resources.

In some embodiments, the first method includes determining a modified set of resources when indicating a NACK on PUCCH, i.e., to request a re-transmission grant and sending an IUC report to the peer transmitter UE, where the IUC report includes the modified set of resources. In some embodiments, the first method includes determining a modified set of resources when transmitting a sidelink scheduling request to a serving RAN and sending an IUC report to the peer transmitter UE, where the IUC report includes the modified set of resources.

In some embodiments, the first method includes determining a modified set of resources when transmitting a sidelink buffer status report to the serving RAN and sending an IUC report to the peer transmitter UE, where the IUC report includes the modified set of resources. In some embodiments, the first method includes receiving a request for IUC from the peer transmitter UE. In such embodiments, transmitting the indication of the identified intersection occurs in response to the IUC request.

Disclosed herein is a second apparatus for inter-UE coordination when using SL DRX, according to embodiments of the disclosure. The second apparatus may be implemented by a transmitter UE device, such as the remote unit 105, the Tx UE 210, the UE-B, the UE-B 510, and/or the user equipment apparatus 600, described above. The second apparatus includes a processor and a transceiver that receives, from a peer receiver UE, an indication of an intersection of a set of resources for sidelink communication and a DRX configuration active time during which sidelink data is to be exchanged with the peer receiver UE. The processor performs resource selection from the set of resources for an initial transmission to the peer receiver UE, where the resource selection is based on the DRX configuration active time of the peer receiver UE. The transceiver exchanges sidelink data with the peer receiver UE during the active time using the selected resources.

In some embodiments, the DRX configuration active time includes a time where any sidelink DRX timer is already running or is to run in the future. In some embodiments, the processor updates a DRX configuration of the second apparatus based on the received set of resources. In some embodiments, the DRX configuration active time includes a common active period aligned between the receiver UE and the peer transmitter UE.

In some embodiments, the transceiver sends a request for IUC, where the indication of the intersection is received in response to the IUC request. In some embodiments, the processor determines a modified set of resources when requesting a sidelink CSI report from the peer receiver UE and the transceiver sends an IUC report to the peer receiver UE, where the IUC report includes the modified set of resources.

Disclosed herein is a second method for inter-UE coordination when using SL DRX, according to embodiments of the disclosure. The second method may be performed by a transmitter UE device, such as the remote unit 105, the Tx UE 210, the UE-B, the UE-B 510, and/or the user equipment apparatus 600, described above. The second method includes receiving, from a peer receiver UE, an indication of an intersection of a set of resources for sidelink communication and a DRX configuration active time during which sidelink data is to be exchanged with the peer receiver UE. The second method includes performing resource selection from the set of resources for an initial transmission to the peer receiver UE, where the resource selection is based on the DRX configuration active time of the peer receiver UE.

The second method includes transmitting sidelink data to the peer receiver UE during the active time using the selected resources.

In some embodiments, the DRX configuration active time includes a time where any sidelink DRX timer is already running or is to run in the future. In some embodiments, the second method further includes updating a DRX configuration of the transmitter UE based on the received set of resources. In some embodiments, the DRX configuration active time includes a common active period aligned between the receiver UE and the peer transmitter UE.

In some embodiments, the second method further includes sending a request for IUC, where the indication of the intersection is received in response to the IUC request. In some embodiments, the second method further includes determining a modified set of resources when requesting a sidelink CSI report from the peer receiver UE and sending an IUC report to the peer receiver UE, where the IUC report comprises the modified set of resources.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a receiver User Equipment ("UE"), the method comprising:
   determining a discontinuous reception ("DRX") configuration that is to be used towards a peer transmitter UE, the DRX configuration comprising an active time during which sidelink data is exchanged with the peer transmitter UE;
   determining a set of resources for sidelink communication by performing a sensing procedure;
   identifying an intersection of the active time and the set of resources, wherein the intersection comprises a modified set of resources; and
   transmitting an indication of the identified intersection to the peer transmitter UE.

2. The method of claim 1, wherein determining the set of resources further comprises performing a sidelink resource selection procedure, wherein the determined set of resources comprises one or more of: a preferable resource based on a sensing result, a non-preferable resource based on the sensing result, or a resource having a potential collision.

3. The method of claim 1, wherein the active time comprises a common active period aligned between the receiver UE and the peer transmitter UE.

4. The method of claim 3, further comprising receiving a higher layer parameter that indicates the common active period.

5. The method of claim 3, wherein an amount of intersecting candidate resources in the common active period is less than a predetermined amount, wherein transmitting the indication of the identified intersection comprises transmitting a preferred resource outside the common active period.

6. The method of claim 1, wherein determining the set of resources comprises receiving at a MAC layer a candidate report from a physical layer, wherein the MAC layer identifies the intersection of the active time and the set of resources.

7. The method of claim 1, further comprising:
   determining an additional modified set of resources when indicating a negative acknowledgement ("NACK") on a physical uplink control channel ("PUCCH") to request a re-transmission grant; and sending an inter-UE coordination ("IUC") report to the peer transmitter UE, wherein the IUC report comprises the additional modified set of resources.

8. The method of claim 1, further comprising:

determining an additional modified set of resources when performing one of:

transmitting a sidelink scheduling request to a serving RAN, transmitting a sidelink buffer status report to the serving RAN, and receiving a request for a sidelink channel state information ("CSI") report from the peer transmitter UE; and sending an inter-UE coordination ("IUC") report to the peer transmitter UE, wherein the IUC report comprises the additional modified set of resources.

9. The method of claim 1, further comprising receiving a request for inter-UE coordination ("IUC") from the peer transmitter UE, wherein the indication of the identified intersection is transmitted in response to the IUC request.

10. A User Equipment ("UE"), comprising:

at least one memory; and at least one processor coupled with the at least one memory and configured to cause the UE to:

determine a discontinuous reception ("DRX") configuration that is to be used towards a peer transmitter UE, the DRX configuration comprising an active time during which sidelink data is exchanged with the peer transmitter UE;

determine a set of resources for sidelink communication by performing a sensing procedure;

identify an intersection of the active time and the set of resources, wherein the intersection comprises a modified set of resources; and transmit an indication of the identified intersection to the peer transmitter UE.

11. A User Equipment ("UE"), comprising:

at least one memory; and at least one processor coupled with the at least one memory and configured to cause the UE to:

receive, from a peer receiver UE, an indication of an intersection of a set of resources for sidelink communication and a discontinuous reception ("DRX") configuration active time during which sidelink data is to be exchanged with the peer receiver UE, wherein the set of resources for sidelink communication are determined by performing a sensing procedure and the intersection comprises a modified set of resources;

perform resource selection from the set of resources for an initial transmission to the peer receiver UE, said resource selection based on the DRX configuration active time of the peer receiver UE; and transmit sidelink data to the peer receiver UE during the active time using the selected resources.

12. The UE of claim 11, wherein the DRX configuration active time comprises a time where a sidelink DRX timer is already running or is to run in the future.

13. The UE of claim 11, wherein the at least one processor is further configured to cause the UE to send a request for inter-UE coordination ("IUC"), wherein the indication of the intersection is received in response to the IUC request.

14. The UE of claim 11, wherein the at least one processor is further configured to cause the UE to update a DRX configuration of the UE based on the received indication of the intersection of the set of resources, wherein the DRX configuration active time comprises a common active period aligned between the UE and the peer receiver UE.

15. The UE of claim 11, wherein the at least one processor is further configured to cause the UE to:

determine an additional modified set of resources when requesting a sidelink channel state information ("CSI") report from the peer receiver UE, and transmit an inter-UE coordination ("IUC") report to the peer receiver UE, wherein the IUC report comprises the additional modified set of resources.

16. The method of claim 1, wherein the set of resources comprises resources within the active time and resources outside of the active time.

17. The method of claim 16, wherein the modified set of resources comprises the resources within the active time.

18. The UE of claim 10, wherein the set of resources comprises resources within the active time and resources outside of the active time, and wherein the modified set of resources comprises the resources within the active time.

19. The UE of claim 11, wherein the set of resources comprises resources within the active time and resources outside of the active time.

20. The UE of claim 19, wherein the modified set of resources comprises the resources within the active time.

* * * * *